United States Patent [19]

Taylor

[11] 4,166,639

[45] Sep. 4, 1979

[54] LIFT AXLE WHEEL ASSEMBLY

[76] Inventor: Glenn E. Taylor, 1345 Bankhead Ave., Atlanta, Ga. 30318

[21] Appl. No.: 882,234

[22] Filed: Feb. 28, 1978

[51] Int. Cl.² .................................................. B60G 11/56
[52] U.S. Cl. ..................................... 280/704; 267/34; 280/711
[58] Field of Search .................. 267/34; 280/704, 711, 280/712, 713, 715

[56] References Cited

U.S. PATENT DOCUMENTS

| | | | |
|---|---|---|---|
| 2,137,662 | 11/1938 | Alvarez | 267/34 |
| 3,285,621 | 11/1966 | Turner | 280/704 |
| 3,617,072 | 11/1971 | Turner | 280/704 |
| 3,653,683 | 4/1972 | Hendrickson | 280/713 |
| 3,689,102 | 9/1972 | Granning | 280/704 |
| 3,870,336 | 3/1975 | Bilas | 280/704 |
| 3,877,718 | 4/1975 | Scanlon | 280/704 |
| 3,904,220 | 9/1975 | Fier | 280/704 |
| 3,966,223 | 6/1976 | Carr | 280/712 |
| 4,000,913 | 1/1977 | Gibson | 280/704 |

OTHER PUBLICATIONS

Neway Air Ride, Specification Form SD-399-2-74.

Primary Examiner—Joseph F. Peters
Assistant Examiner—John A. Carroll
Attorney, Agent, or Firm—Jones, Thomas & Askew

[57] ABSTRACT

An auxiliary lift axle wheel assembly is mounted to a vehicle body by L-shaped levers, each of which is pivotally mounted at the intersection of its legs to the vehicle, and the lift axle is held in its upward, unloaded position on the longitudinally extending legs of the levers by the force of springs bearing against the upwardly extending legs of the levers. Air inflatable air springs positioned between the auxiliary lift axle and vehicle body are filled with air to move the auxiliary axle downward relative to the vehicle body with force sufficient to overcome the force of the springs to urge the wheels of the axle down into load-bearing engagement with the road surface beneath the vehicle.

8 Claims, 2 Drawing Figures

U.S. Patent  Sep. 4, 1979  4,166,639
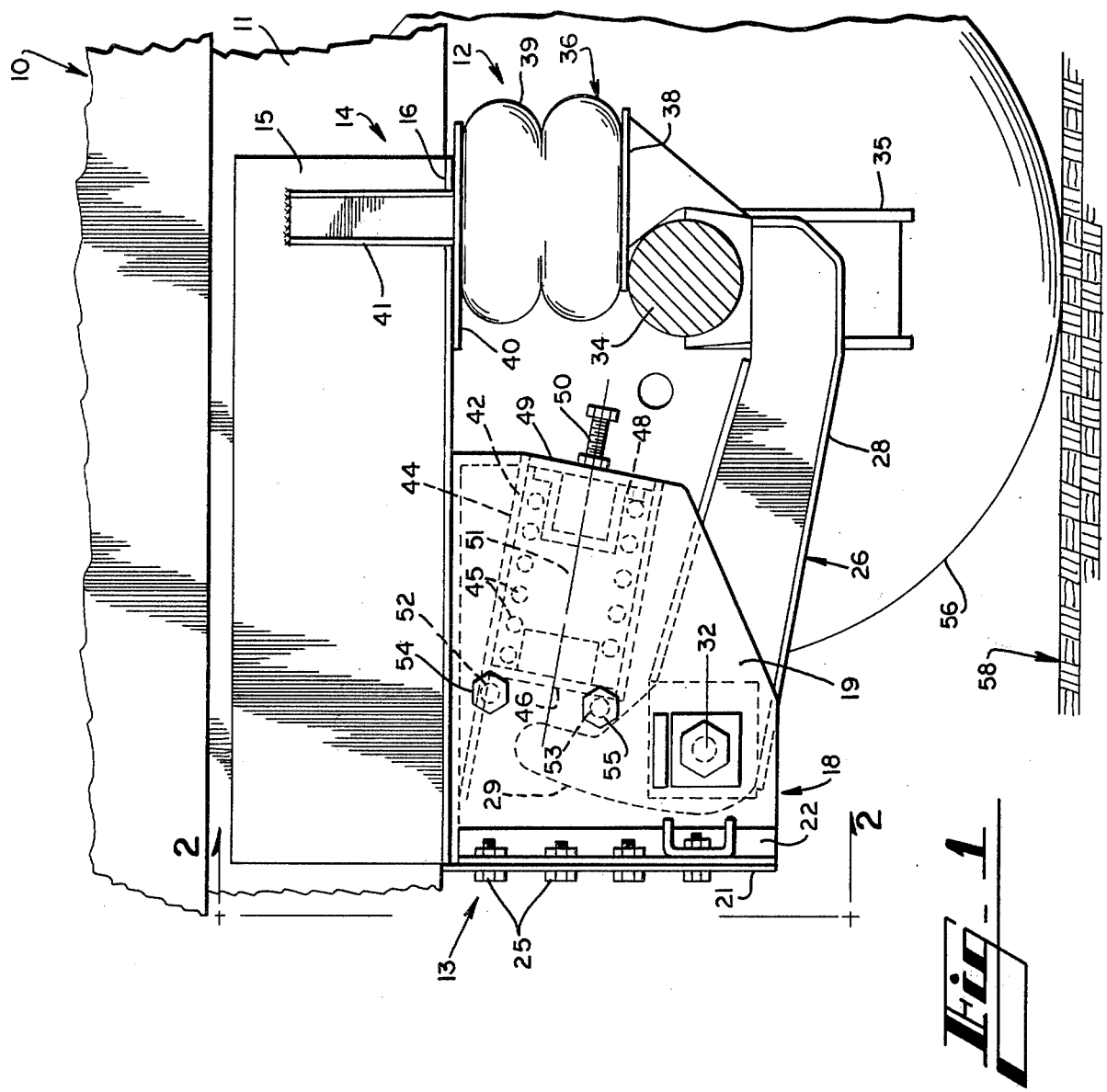
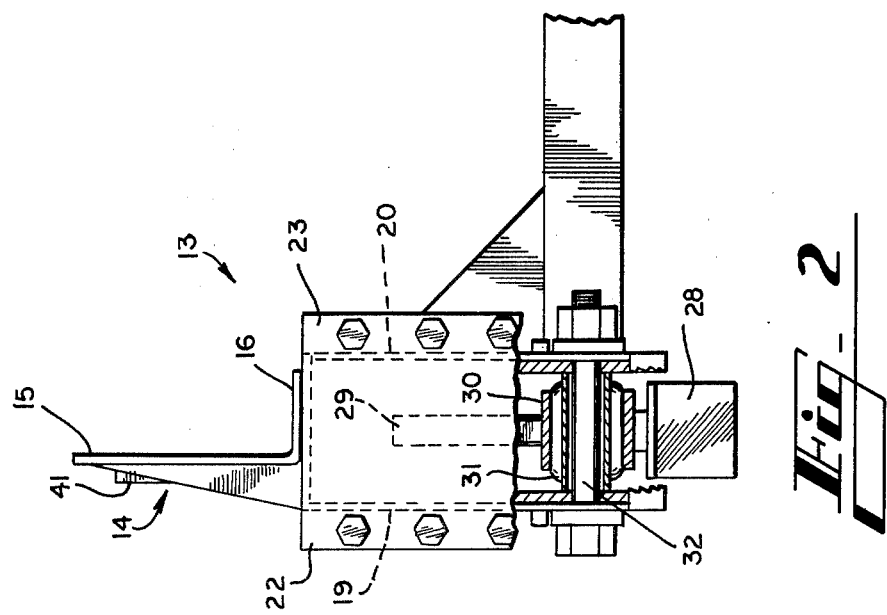

LIFT AXLE WHEEL ASSEMBLY

BACKGROUND

This invention relates to auxiliary lift axle wheel assemblies for load carrying vehicles, in which an auxiliary axle and wheel assembly carried by the vehicle can be moved down toward load-bearing engagement with the road surface when the vehicle is heavily loaded, or can be lifted upwardly away from the road surface when there is little or no load carried by the vehicle.

The prior art includes lift axle wheel assemblies of various arrangements whereby air inflatable bags or "air springs" positioned between the auxiliary axle and vehicle body are used to force the auxiliary axle downward relative to the vehicle body into engagement with the road surface. In some of the prior art structure such as shown in U.S. Pat. No. 3,730,549, the inflatable air bags are positioned in direct contact with the axle, that is approximately atop the axle. In other prior art, such as U.S. Pat. No. 3,771,812, the auxiliary lift axle is supported at its ends by levers each pivotally mounted to the vehicle at one end, the axle mounted intermediate the ends of the levers, and the inflatable air bags positioned over the other ends of the levers. In both prior art structures, inflating the air bags places a downward force on the auxiliary lift axle, moving it downward relative to the vehicle body toward load bearing engagement with the road surface.

When it is not necessary to use the auxiliary lift axle, it should be returned to its "up" position and held there away from contact with the road surface to avoid unnecessary wear on its wheels. In some of the prior art lift axle wheel assemblies leaf springs have been used to lift the auxiliary axle when the air springs are deflated. The leaf spring assembly is connected at its mid-point to the axle with its forces directed upward against the air bags, thus holding the axle up until the spring force is overcome by the force of inflating bags.

Coil springs also have been used in some prior art lift axle wheel assemblies to lift the axle. For example, U.S. Pat. No. 3,771,812 illustrates a coil tension spring which is expanded by downward motion of the axle. When the downward force exerted by the air bags is removed, the spring contracts and lifts the axle to its up position.

In most of the known prior art lift axle wheel assemblies the springs used to lift the axle have been large and cumbersome and the springs have been exposed to the dirt and other road contaminants which, in some instances, are deleterious to the spring structure.

SUMMARY OF THE INVENTION

The present invention involves an auxiliary lift axle wheel assembly for load carrying vehicles. The assembly includes L-shaped levers at each end of the axle, with each lever being pivotally mounted at the intersection of its legs to the vehicle and having a leg extending longitudinally with respect to the direction of movement of the vehicle and an upwardly extending leg. The lift axle is mounted at its ends on the longitudinal legs of the levers and inflatable air bags or air springs are positioned between the vehicle and the axle and arranged, when inflated, to urge the axle and its wheels downwardly toward load-bearing engagement with the road surface beneath the vehicle. Coil compression springs are arranged to bear against the upwardly extending legs of the levers to continuously bias the levers in the direction which lifts the axle and its wheels up away from the road surface. The springs are enclosed in a housing and are oriented with their line of force oriented approximately longitudinally with respect to the direction of movement of the vehicle and over the longitudinal leg of the lever in a convenient and compact arrangement.

Therefore, it is an object of this invention to provide a lift axle wheel assembly which is compact and simple in construction, which is convenient to install and to maintain, and which is inexpensive to construct and to install.

These and other objects, features and advantages of the present invention will become apparent from reference to the following description, attached drawings and appended claims.

BRIEF DESCRIPTION OF THE DRAWINGS

FIG. 1 is a side view of a suspension assembly at one end of the lift axle assembly according to the invention with the auxiliary lift axle in its down position.

FIG. 2 is an end view of a portion of a suspension assembly at the other end of the lift axle assembly of FIG. 1, with parts broken away for clarity.

DETAILED DESCRIPTION OF AN EMBODIMENT

Referring now in more detail to the drawings, in which like numbers indicate like parts throughout the several views, FIG. 1 illustrates the lower portion of a load carrying vehicle 10 which includes a vehicle support frame 11. The frame is supported by vehicle wheels (not shown), and the auxiliary lift axle wheel assembly 12 is mounted to the vehicle. The auxiliary lift axle wheel assembly includes suspension assemblies 13 at each end of the axle and at opposite sides of the vehicle. Each suspension assembly includes an L-shaped mounting bracket 14 having an upwardly extending plate 15 for mounting against the outside vertical surface of the vehicle frame 11 and a horizontal plate 16 for mounting against the lower horizontal surface of the frame. The mounting bracket is attached to the frame by conventional means, such as by welding or by bolts extending through the vertical plate 15 and into the frame 11. Outer housing 18 is attached to the lower horizontal plate 16 of the L-shaped mounting bracket 14 and includes substantially identical side walls 19 and 20, end wall 21 and vertically extending angle iron supports 22 and 23 at the intersection of the end wall 21 with the two side walls 19 and 20. The angle iron strips 22 and 23 are welded to side walls 19 and 20, and end wall 21 is connected to the angle iron strips 22 and 23 by means of bolts 25. The outer housing 18 is therefore closed at its upper, opposite sides and one end surfaces, while the other end and lower portion thereof remain open.

An L-shaped lever 26 is pivotally mounted in each outer housing 18 of each suspension assembly. Each L-shaped lever 26 includes a longitudinally extending leg 28 and an upwardly extending leg 29, and the levers are pivotally supported at the intersection of their legs within the outer housing 18. The levers 26 are formed with a collar 30, and a bearing 31 extends through the collar. A pivot pin 32 extends through the outer housing 18 and through the bearing 31 of each lever, so that the levers are arranged to pivot about a horizontal axis which is transverse to the direction of movement of the vehicle so that the longitudinal leg of each lever extends approximately along the direction of movement of the vehicle.

Lift axle 34 is mounted at its ends on the free or movable ends of the longitudinal legs 28 of each lever 26. The axle 34 illustrated in the drawing is a drop axle in that the intermediate portion 35 of the axle is bent in a downward direction beneath the vehicle 10 so as to accommodate the vehicle drive shaft and other apparatus extending beneath the vehicle.

An inflatable air bag assembly or air spring 36 is mounted over the end portion of axle 34 and beneath the horizontal plate 16 of L-shaped mounting bracket 15 in each suspension assembly 13. Each inflatable air bag assembly 36 includes mounting plate 38 connected to axle 34, air bags 39 mounted on plate 38, upper plate 40 bearing against the horizontal plate 16 of the L-shaped mounting bracket 14 and upright connector 41 which is welded to the vertical plate 15 of the L-shaped mounting bracket 14. Air lines (not shown) communicate with the inflatable air bags 39 so as to supply air under pressure to inflate the air bags, and to vent the air bags, causing the air bags to expand and contract.

A spring assembly 42 is mounted in the outer housing 18 of each suspension assembly 13 and includes spring housing 44, coil compression spring 45, movable bearing plate 46, movable inner end plate 48, and other end plate 49. Spring 45 is a coil compression spring with its ends in engagement with bearing plate 46 and inner end plate 48. Spring adjustment screw 50 is threaded through the end plate 49 of spring housing 44, and when the screw 50 is rotated to move in or out through end plate 49, the inner plate 48 is moved away from or toward the outer end plate 49, thereby compressing or expanding coil compression spring 45 thereby increasing or decreasing the force of spring 45 against bearing plate 46. Coil compression spring 45 is oriented so that its line of force 51 extends approximately longitudinally with respect to the direction of movement of the vehicle 10 and approximately perpendicular to the upward extending leg 29 of lever 26.

Aligned openings 52 and 53 are formed in the side walls 19 and 20 of outer housing 18 of each suspension system 13 and spring retaining pins 54 and 55 are insertable through the openings. The openings in the pins are in alignment with coil compressing spring 45 and are in the path of bearing plate 46, so that when the spring 45 has been contracted, the pins 54 and 55 can be inserted through the aligned openings 52 and 53, the spring allowed to expand, and the pins will then hold the spring 45 in spring housing 44. With this arrangement, the L-shaped lever 26 can be removed from the assembly for repair or other purposes while the spring 45 is retained in its spring housing 44.

The auxiliary lift axle wheel assembly is assembled as a unit without the wheels 56, but including the hubs and brake equipment (not shown), and then is attached to a vehicle 10 by connecting the L-shaped bracket 14 to the frame 11 of the vehicle. After the wheels 56 have been mounted to the hubs of the axle 34 and the air system of the vehicle connected to the air bags 39, the apparatus is ready for use. When the air bags 39 are inflated, they urge the axle 34 and the wheels 56 in a downward direction toward load-bearing relationship with respect to the road surface 58. As the axle 34 is forced in a downward direction, the lever 26 pivots about its pivot pin 32, with the longitudinal leg 28 of the lever moving from an approximately horizontal attitude toward a downwardly inclined attitude, and with the upwardly extending leg 29 moving from an approximately upright attitude toward a sloped attitude. As the lever 26 is moved by the expansion of air bags 39, the upwardly extending leg bears against bearing plate 46 of the spring assembly 42 and moves the bearing plate 46 further into the spring housing 44 against the force of coil compression spring 45. Thus, the downward force applied by the air bags 39 must first overcome the opposing forces of springs 45 until the wheels 56 engage the road surface 58, whereupon further downward movement of the wheels 56 causes the wheel assembly to assume at least a portion of the weight of the vehicle 10. When it is desired to raise wheels 56 away from the road surface 58, the air in the air bags 39 is vented to relieve the downward force applied to the wheels 56, whereupon the force from coil compression springs 45 against the upwardly extending legs 29 of levers 26 tends to pivot the levers 26 and raise axle 34 and wheels 56 to their upward, retracted positions.

While this invention has been described in detail with particular reference to a preferred embodiment thereof, it will be understood that variations and modifications can be effected within the spirit and scope of the invention as described hereinbefore and as defined in the appended claims.

What is claimed is:

1. A lift-axle wheel assembly for a wheeled vehicle comprising: an axle for placement transversely beneath the vehicle, a housing for mounting to the frame of the vehicle at each end of said axle, an approximately L-shaped lever in each housing pivotally mounted at the intersection of its legs in each housing about an approximately horizontal axis and pivotable in an approximately vertical plane with one leg of said lever extending in an upward direction and the other leg of said lever extending longitudinally with respect to the vehicle, said axle being mounted at its ends on a longitudinally extending leg of each lever, an inflatable pneumatic chamber mounted at each end of said axle for bearing between the frame of the vehicle and said axle and, upon inflation, urging said axle downwardly with respect to the vehicle, and coil compression spring means mounted in each of said housings over and approximately parallel to the longitudinally extending leg of the lever in the housing with each spring means in engagement with the upwardly extending leg of the lever and arranged to urge the longitudinal leg of the lever upwardly against the force of the inflatable pneumatic chambers.

2. The lift axle wheel assembly of claim 1 and wherein said spring means comprise a coil compression spring in each housing with each spring means arranged to apply its forces approximately longitudinally with respect to the vehicle.

3. The lift axle wheel assembly of claim 1 and wherein said axle comprises a drop axle including end portions for mounting wheels thereon and a central portion which is lower than said end portions.

4. The lift axle wheel assembly of claim 1 and wherein said housings each define openings therein in alignment with the end of its said spring means whereby retaining pins or the like are insertable into the housing from outside the housing for holding the spring in the housing when the axle and L-shaped lever arms are removed from the vehicle.

5. An auxiliary axle assembly for a wheeled vehicle comprising an axle for mounting transversely beneath the vehicle, wheels mounted on each end of said axle, a mounting frame at each end of said axle for mounting to the vehicle, an air inflatable bag positioned at each end of said axle and arranged to bear between said mounting frame and said axle, an approximately L-shaped lever at each end of said axle with each lever including a first extension extending approximately longitudinally with respect to the vehicle, said first extension being connected at one of its ends to an end portion of said axle and being pivotally mounted at its other end to said mounting frame, a spring housing mounted on each mounting frame, each said lever including a second upwardly projecting extension, spring means positioned in each spring housing over the first extension of said lever each said spring housing including a rear wall, side walls and a movable bearing plate opposite said rear wall, said bearing plate being movable relative to said rear wall in a path perpendicular to the plane of said rear wall, each said spring means having one of its ends braced against said rear wall of said housing and having its other end bearing against said movable bearing plate, each upwardly projecting lever extension contacting said movable bearing plate, whereby downward movement of said axle resulting from expansion of said air bags forces each upwardly projecting lever extension against its movable bearing plate and causes the spring means to contract, and said spring means urges said axle upwardly against said air bags.

6. Auxiliary axle assembly of claim 5 and wherein said spring housings each include openings therein adjacent the upwardly extending projections of said levers for receiving retaining pins to hold the spring means in said housing when the lever is removed from the vehicle.

7. A lift axle wheel assembly for a wheeled vehicle comprising: an axle for placement transversely beneath the vehicle, wheels mounted on each end of said axle, and at each end of said axle; a mounting bracket for mounting said wheel assembly to a wheeled vehicle, a housing mounted on said mounting bracket, an L-shaped lever pivotally mounted at the intersection of its legs to said housing, with each L-shaped lever having one leg extending in an upward direction and its other leg extending longitudinally with respect to the direction of travel of said wheel assembly, an inflatable pneumatic chamber mounted between said axle and said mounting bracket, and a coil compression spring mounted in said housing over the longitudinally extending leg of said L-shaped lever and biased against the upwardly extending leg of said lever and arranged to urge the L-shaped lever against said inflatable pneumatic chamber, and said axle being mounted at its ends to the longitudinally extending ends of said L-shaped levers, whereby the springs tend to pivot said L-shaped levers in one direction to lift and hold the wheels of the axle upwardly away from engagement with the road surface and the inflation of the pneumatic chambers tends to pivot said L-shaped levers in the opposite direction to lower and hold the wheels of the axle down in engagement with the road surface.

8. The lift axle wheel assembly of claim 7 and wherein each of said housings includes receptacles for receiving and holding pin members in the path of movement of the spring in said housing, whereby when pin members are inserted into the receptacles the lever arms can be removed from the lift axle wheel assembly and the springs are retained in said housing.

* * * * *